United States Patent [19]

Ueno et al.

[11] 3,714,227
[45] Jan. 30, 1973

[54] PROCESS FOR THE PREPARATION OF P-HYDROXYBENZOIC ACID ESTER ALKALI METAL SALTS

[75] Inventors: Ryuzo Ueno; Tetsuya Miyazaki, both of Nishinimiya, Japan

[73] Assignee: Kabushiki Kaisha Ueno Seiyaku Oyo Kenkyajo, Higashi-ku, Osaka, Japan

[22] Filed: Sept. 4, 1970

[21] Appl. No.: 69,917

[52] U.S. Cl. ............................................. 260/473 S
[51] Int. Cl. ............................................. C07c 69/78
[58] Field of Search ............................... 260/473 S

[56] References Cited

UNITED STATES PATENTS 2,374,949   5/1945   Niederl..............................260/473 S

*Primary Examiner*—Lorraine A. Weinberger
*Assistant Examiner*—John F. Terapane
*Attorney*—Wenderoth, Lind & Ponack

[57] ABSTRACT

A process for the preparation of alkali metal salts of p-hydroxybenzoic acid esters, which comprises reacting a p-hydroxybenzoic acid ester with an alkali metal phenoxide.

7 Claims, No Drawings

PROCESS FOR THE PREPARATION OF P-HYDROXYBENZOIC ACID ESTER ALKALI METAL SALTS

This present invention relates to a process for the preparation of p-hydroxybenzoic acid ester alkali metal salts.

There are various reactions using alkali metal salts of p-hydroxybenzoic acid esters especially the anhydrous thereof, but no method for producing alkali metal salts of anhydrous p-hydroxybenzoic acid esters easily and at low cost has hitherto been known. For example, an alkali metal salt of an anhydrous p-hydroxybenzoic acid ester is used in the preparation of 4,4'-(ethylenedioxy)-bisbenzoic acid diester, 4-(2-hydroxyethoxy)-benzoic acid ester, etc. which are raw materials of synthetic fibers and plastics. To prepare this alkali metal salt of p-hydroxybenzoic acid ester, the method of reacting a p-hydroxybenzoic acid ester with an alkali hydroxide solution, and then dehydrating and drying the reaction product at a temperature as low as possible while preventing its hydrolysis has been adopted. However, since in this method the operation temperature is limited to comparatively low temperatures such as room temperature, a large amount of water is required on account of the solubility of the objective compound, the amount of water to be evaporated is large, thus a heat economical problem arises, and a long period of time of over 20 hours is required for the operation which is complicated. Further, there is another problem that the apparatus is complicated and costly.

The object of the present invention is to provide an industrial process for preparing alkali metal salts of p-hydroxybenzoic acid esters especially the anhydrous thereof easily and at low cost.

The inventors of the present invention have discovered that if a p-hydroxybenzoic acid ester is reacted with an alkali metal phenoxide, the reaction represented by the equation:

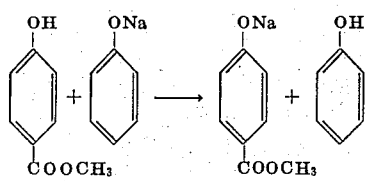

proceeds almost quantitatively speedily and hardly influenced by temperature on type of solvent, and thus an alkali metal salt of the p-hydroxybenzoic acid ester is obtained.

Namely, according to the present invention, a process for the preparation of alkali metal salts of p-hydroxybenzoic acid esters comprising reacting a p-hydroxybenzoic acid ester with an alkali metal phenoxide is provided.

The p-hydroxybenzoic acid esters usable in the present invention can be represented by the general formula:

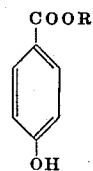

(I)

(wherein R is an alkyl radical having up to 10 carbon atoms, an aryl radical having six to 10 carbon atoms or an aralkyl radical having seven to 10 carbon atoms).

As esters of said formula (I), methyl, ethyl, propyl, phenyl, benzyl and tolyl esters of p-hydroxybenzoic acid are all usable, but the methyl and ethyl esters are generally preferable.

As the alkali metal phenoxide, sodium phenoxide, potassium phenoxide or lithium phenoxide is used.

Thus, the alkali metal salts of p-hydroxybenzoic acid esters obtainable by the present invention can be represented by the general formula:

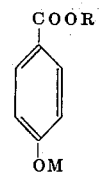

(wherein R is an alkyl radical having up to 10 carbon atoms, an aryl radical having six to 10 carbon atoms or an aralkyl radical having seven to 10 carbon atoms; and M is an alkali metal).

The reaction may be carried out either in an inert organic solvent or without using any organic solvent. In case no organic solvent is used, it is preferable that a p-hydroxybenzoic acid ester should be reacted with an alkali metal phenoxide by using an excess (up to 20 times mols based on the alkali metal phenoxide) of the p-hydroxybenzoic acid ester. In this case, the reaction proceeds with the excess of the p-hydroxybenzoic acid ester as reaction medium, and the formed alkali metal salt of p-hydroxybenzoic acid ester is obtained as a mixture with the unreacted p-hydroxybenzoic acid ester, while on the other hand the phenol formed as by-product can easily be separated and removed by distillation under reduced or atmospheric pressure. The recovered mixture of the p-hydroxybenzoic acid ester alkali metal salt and the p-hydroxybenzoic acid ester can be reacted as they are with ethylene oxide or ethylene dihalide to produce 4-(2-hydroxyethoxy)-benzoic acid ester of 4,4'-ethylenedioxy-bisbenzoic acid diester.

As regards the inert organic solvent, it is preferable to use an organic solvent which dissolve the phenol but does not dissolve the p-hydroxybenzoic acid ester alkali metal salt, such as hydrocarbons, e.g., benzene, toluene, xylene or petroleum hydrocarbons, ethers, e.g., ethyl ether, isopropyl ether, isobutyl ether or anisole, or ketones, e.g., acetone, methyl ethyl ketone, methyl isobutyl ketone or diisobutyl ketone. In case these inert organic solvents are used, the formed p-hydroxybenzoic acid ester alkali metal salt can generally be recovered as precipitate, and the phenol remains in a condition dissolved in the inert organic solvent, and so it can be recovered easily and without appreciable loss by separation with solvent or evaporation.

Since no water is formed in this reaction, an alkali metal salt of an anhydrous p-hydroxybenzoic acid ester can be obtained by using an anhydrous alkali metal phenoxide. For example, since the raw material alkali metal phenoxide has no readily hydrolyzable ester radical, etc., it can be dried and dehydrated at high temperatures, and as a result an anhydrous alkali metal phenoxide can be produced easily and in a very short period of time. Further, the reaction between the alkali phenolate and a p-hydroxybenzoic acid ester proceeds fast at low temperatures as described above, and an alkali metal salt of an anhydrous p-hydroxybenzoic acid ester can be obtained easily.

Further, in the present invention, a hydrous alkali metal phenoxide containing up to 50 percent by weight, preferably up to 40 percent by weight, of water may be used as the alkali metal phenoxide.

Namely, in the method of the present invention, unlike the case where a p-hydroxybenzoic acid ester is reacted directly with an alkali metal hydroxide, it has been found that the hydrolysis of the ester radical does not take place even if an alkali metal phenoxide containing a comparatively large amount of water, e.g., up to 50 percent by weight of water, is heated to above 100° C. Accordingly, a hydrous alkali metal salt of a p-hydroxybenzoic acid ester can easily be obtained from a hydrous alkali metal phenoxide, and a substantially anhydrous alkali metal salt of a p-hydroxybenzoic acid ester can easily be obtained by merely drying it.

The reaction temperature is not particularly limited, and a temperature of room temperature to 250° C. is generally used, but in case a hydrous alkali metal phenoxide is used, it is desirable that the reaction temperature should be not more than 150°C.

The present invention will be further explained by using examples.

EXAMPLE 1

11.6 g (0.1 mol) of anhydrous sodium phenoxide, 35 g of toluene and 15.2 g (0.1 mol) of methyl p-hydroxybenzoate were mixed together, and the mixture was stirred at 100° C. for about 15 minutes. After cooling it, the insoluble matter was separated by filtration, washed with a small amount of toluene, and then the remaining toluene was removed by evaporation. Thus, 17.1 g of sodium salt of anhydrous methyl p-hydroxybenzoate were obtained.

EXAMPLE 2

Sixty-one g (0.4 mol) of methyl p-hydroxybenzoate were melted by heating it to 140° C., 11.6 g (0.1 mol) of anhydrous sodium phenoxide were added thereto, and the mixture was stirred at 140° C. for about 15 minutes. By distilling off the free phenol under reduced pressure (1–5 mmHg), a mixture of 45.7 g of methyl p-hydroxybenzoate and 17.4 g of sodium salt of anhydrous methyl p-hydroxybenzoate was obtained.

EXAMPLE 3

13.2 g (0.1 mol) of anhydrous potassium phenoxide, 40 g of benzene and 16.6 g (0.1 mol) of ethyl p-hydroxybenzoate were mixed together, and the mixture was heated and refluxed under stirring for about 30 minutes on a water bath. After cooling, the insoluble matter was separated by filtration, it was washed with a small amount of benzene, and then the remaining benzene was evaporated. Thus, 20.0 g of potassium salt of anhydrous ethyl p-hydroxybenzoate were obtained.

EXAMPLE 4

Fifty-eight g (0.35 mol) of ethyl p-hydroxybenzoate were melted by heating it to 130° C., 11.8 g (0.1 mol) of sodium phenoxide (water content: 2.0 percent) were added thereto, and the mixture was stirred at 130° C. for about 15 minutes. By distilling off the free phenol under reduced pressure (1–5 mm Hg), a mixture of 41.5 g of ethyl p-hydroxybenzoate and 18.5 g of sodium salt of ethyl p-hydroxybenzoate was obtained.

EXAMPLE 5

One hundred eighty-four g (1.0 mol) of a 63 percent aqueous solution of sodium phenoxide were mixed with 608 g (4.0 mols) of methyl p-hydroxybenzoate, and then the mixture was reacted by heating it at 120° C. under stirring while distilling off the water and the free phenol. Next, the temperature was raised to 140° C., and the water and the phenol were further distilled off under reduced pressure (1–5 mm Hg). Thus, 454 g of methyl p-hydroxybenzoate and 171 g of sodium salt of anhydrous methyl p-hydroxybenzoate were obtained.

EXAMPLE 6

13.2 g (0.1 mol) of anhydrous potassium phenoxide, 40 g of acetone and 19.4 g (0.1 mol) of butyl p-hydroxybenzoate were mixed together, and the mixture was stirred at room temperature for about 1 hour. The insoluble matter was separated by filtration, it was washed with a small amount of acetone, and then the remaining acetone was evaporated. Thus, 22.6 g of potassium salt of anhydrous butyl p-hydroxybenzoate were obtained.

EXAMPLE 7

11.6 g (0.1 mol) of anhydrous sodium phenoxide, 40 g of isopropyl ether and 25.6 g (0.1 mol) of octyl p-hydroxybenzoate were mixed together, and the mixture was heated and refluxed under stirring for about 30 minutes on a water bath. After cooling, the insoluble matter was separated by filtration, it was washed with a small amount of isopropyl ether, and then the remaining isopropyl ether was evaporated. Thus, 26.4 g of sodium salt of anhydrous octyl p-hydroxybenzoate were obtained.

EXAMPLE 8

Eighty-six g (0.4 mol) of phenyl p-hydroxybenzoate were melted by heating it to 180° C., 11.6 g (0.1 mol) of anhydrous sodium phenoxide were added thereto, and the mixture was stirred at 180° C. for about 15 minutes. By distilling off the free phenol under reduced pressure (1–5 mm Hg), a mixture of 64.2 g of phenyl p-hydroxybenzoate and 23.3 g of sodium salt of anhydrous phenyl p-hydroxybenzoate was obtained.

EXAMPLE 9

11.6 g (0.1 mol) of anhydrous sodium phenoxide, 35 g of methyl ketone and 22.8 g (0.1 mol) of benzyl p-hydroxybenzoate were mixed together, and the mixture was heated and refluxed under stirring for about 30 minutes on a water bath. After cooling, the insoluble matter was separated by filtration, it was washed with a small amount of methyl ethyl ketone, and then the remaining methyl ethyl ketone was evaporated. Thus, 24.5 g of sodium salt of anhydrous benzyl p-hydroxybenzoate were obtained.

We claim:

1. A process for the preparation of alkali metal salts of p-hydroxybenzoic acid esters represented by the general formula:

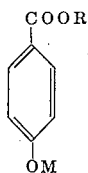

wherein R is an alkyl radical having up to 10 carbon atoms, an aryl radical having six to 10 carbon atoms or an aralkyl radical having seven to 10 carbon atoms; and M is an alkali metal, which comprises reacting a p-hydroxybenzoic acid ester represented by the general formula:

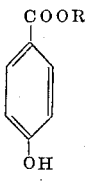

wherein R has the above-defined meanings, with an alkali metal phenoxide in an inert organic solvent selected from the group consisting of hydrocarbons, ethers and ketones or in up to 20 mole excess, based on the alkali metal phenoxide, of the p-hydroxybenzoic acid ester at a temperature from room temperature to 250° C.

2. A process for the preparation of alkali metal salts of substantially anhydrous p-hydroxybenzoic acid esters, which comprises reacting a p-hydroxybenzoic acid ester represented by the general formula;

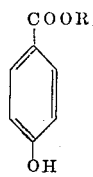

wherein R is an alkyl radical having up to 10 carbon atoms, an aryl radical having six to 10 carbon atoms or an aralkyl radical having seven to 10 carbon atoms with a substantially anhydrous alkali metal phenoxide at a temperature of from room temperature to 250° C by using up to a 20 mole excess, based on the alkali metal phenoxide, of said p-hydroxybenzoic acid ester, evaporating the reaction products thus obtained under reduced or atmospheric pressure to remove the phenol formed as by-product, and recovering a substantially anhydrous mixture of an alkali metal salt of the p-hydroxybenzoic acid ester represented by the general formula:

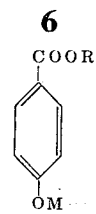

wherein R has the above-defined meanings and M is an alkali metal and the unreacted p-hydroxybenzoic acid ester.

3. A process for the preparation of alkali metal salts of substantially anhydrous p-hydroxybenzoic acid esters, which comprises reacting a p-hydroxybenzoic acid ester represented by the general formula:

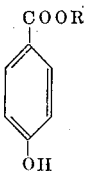

wherein R is an alkyl radical having up to 10 carbon atoms, an aryl radical having six to 10 carbon atoms or an aralkyl radical having seven to 10 carbon atoms with an alkali metal phenoxide containing not more than 50 percent by weight of water at a temperature of not more than 150° C by using up to a 20 mole excess, based on the alkali metal phenoxide, of said p-hydroxybenzoic acid ester, evaporating the reaction products thus obtained under reduced or atmospheric pressure to remove water and the phenol formed as by-product, and recovering a substantially anhydrous mixture of an alkali metal salt of the p-hydroxybenzoic acid ester represented by the general formula:

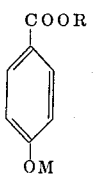

wherein R has the above-defined meanings and M is an alkali metal and the unreacted p-hydroxybenzoic acid ester.

4. The process according to claim 1, wherein the reaction is carried out in an inert organic solvent selected from the group consisting of hydrocarbons, ethers and ketones.

5. The process according to claim 1, wherein the reaction is carried out in an excess of the p-hydroxybenzoic acid ester.

6. The process according to claim 1, wherein an anhydrous alkali metal phenoxide is used as the alkali metal phenoxide.

7. The process according to claim 1, wherein an alkali metal phenoxide containing not more than 50 percent by weight of water is used as the alkali metal phenoxide.

* * * * *